United States Patent
Tsai et al.

(10) Patent No.: US 6,493,311 B1
(45) Date of Patent: Dec. 10, 2002

(54) AUTOMATIC BALANCE DEVICE FOR DISK

(75) Inventors: Jenn-Shing Tsai, Hsin Chu (TW); Lih-Hwa Kuo, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 193 days.

(21) Appl. No.: 09/585,357

(22) Filed: Jun. 2, 2000

(51) Int. Cl.[7] .......................... G11B 19/20; F16F 15/22
(52) U.S. Cl. ...................................... 369/263; 74/573 R
(58) Field of Search ................................ 369/263, 264, 369/271; 74/573 R, 574

(56) References Cited

U.S. PATENT DOCUMENTS 6,243,351 B1    6/2001   Huang

FOREIGN PATENT DOCUMENTS

| JP | 11113213 A | 4/1999 | .......... H02K/07/04 |
| JP | 11341777 A | 12/1999 | .......... H02K/29/00 |
| JP | 2000030355 A | 1/2000 | .......... G11B/19/20 |
| JP | 2000036148 A | 2/2000 | .......... G11B/17/28 |
| JP | 20000102211 A | 4/2000 | .......... H02K/07/04 |

*Primary Examiner*—William Klimowicz
(74) *Attorney, Agent, or Firm*—Rosenberg, Klein & Lee

(57) ABSTRACT

An automatic balance device for disk includes rolling beads of different sizes and a magnetic piece within the turntable or clamping chassis of the CD-ROM driver. The rolling beads of different sizes will be released from the magnetic piece at different rotating speeds of the disk. Therefore, the rolling beads with larger weight are first released from the magnetic piece and then bumped by the rolling beads with smaller weight, which are released from the magnetic piece at a later time. The rolling beads with larger weight can be moved to a desired position to counteract the imbalance force of the disk.

3 Claims, 6 Drawing Sheets

AUTOMATIC BALANCE DEVICE FOR DISK

FIELD OF THE INVENTION

The present invention relates to an automatic balance device for disk, especially to an automatic balance device for disk, which comprises rolling beads of different sizes.

BACKGROUND OF THE INVENTION

The conventional CD-ROM driver, as shown in FIG. 1, mainly comprises a base 10, a stage 11, a pick-up head 12, a spindle motor 13 and a turntable 14. The stage 11 is mounted on the base 10 through a plurality of flexible supports 15. The pick-up head 12 and the spindle motor 13 are placed on the stage 11 and the turntable 14 is fixed on top of the spindle motor 13. An optical disk 16 is mounted on the turntable 14 and is clamped by a clamping chassis 17. The turntable 14 is driven to rotate by the spindle motor 13, and the disk 16 on the turntable 14 is also rotated for accessing data thereon.

In order to reduce vibration and noise for a disk with unbalanced mass, the conventional CD-ROM driver is generally equipped with automatic balance devices. The automatic balance devices are classified as magnetic type and non-magnetic type.

As shown in FIG. 2, the non-magnetic type automatic balance devices for CD-ROM driver comprises a plurality of rolling beads 18 within the turntable 14 or the clamping chassis 17 and of the same size. The plurality of rolling beads 18 are functioned to compensate the imbalance force of the disk 16. However, when the disk starts to rotate, the rolling beads 18 are rolled toward the same orientation of the mass center of the disk with unbalanced mass. Therefore, the disk with unbalanced mass will have larger angular momentum when. beginning to rotate. This is the first drawback of the non-magnetic type automatic balance devices for CD-ROM driver. When the rotation angular frequency of the disk 16 exceeds the natural frequency of the composite structure of the stage 11 and the flexible supports 15, theoretically the rolling beads 18 will be rolled toward direction opposite to the mass center of the disk with unbalanced mass. However, the rolling beads 18 is subject to large frictional force due to large centrifugal force thereof. The rolling beads 18 have not sufficient kinetic energy to reach the designed position for eliminating the imbalance force of the disk 16, and the vibration and noise problems are worsened. This is the second drawback of the non-magnetic type automatic balance devices for CD-ROM driver.

As shown in FIG. 3, the magnetic type automatic balance devices for CD-ROM driver comprises a plurality of rolling beads 18 of same size and a magnetic piece 19 within the turntable 14 or the clamping chassis 17. The plurality of rolling beads 18 are functioned to compensate the imbalance force of the disk 16. The conventional magnetic type automatic balance devices for CD-ROM driver can be of dual-pole configuration or quadruple-pole configuration, as shown in FIGS. 4 and 5, respectively. When the disk starts to rotate, the rolling beads 18 are attracted by the magnetic piece 19 and not rolled toward the same orientation of the mass center of the disk with unbalanced mass, thus preventing worsened vibration and noise. When the rotation angular frequency of the disk 16 exceeds the natural frequency of the composite structure of the stage 11 and the flexible supports 15, the rolling beads 18 will be released from the magnetic piece 19 and rolled toward direction opposite to the inclined direction of the disk with unbalanced mass. However, the rolling beads 18 are of the same size, those rolling beads 18 will be released at the same time. If the rolling beads 18 are released to wrong positions, the rolling beads 18 cannot move to proper positions for eliminating the imbalance force of the disk 16. The rolling beads 18 have considerable frictional force with respect to the turntable 14 due to the large centrifugal force thereof. The rolling beads 18 will have no chance to gain energy to move to proper positions for eliminating the imbalance force of the disk 16.

It is the object of the invention to provide an automatic balance device for disk, by which the vibration and noise of the disk can substantially be eliminated.

To achieve the above object, the present invention provide an automatic balance device for disk, which comprises a plurality of rolling beads of different sizes and a magnetic piece within the turntable or clamping chassis of the CD-ROM driver. The rolling beads of different sizes will be released from the magnetic piece at different rotating speed of disk. Therefore, the rolling beads with larger weight are first released from the magnetic piece and then bumped by the rolling beads with smaller weight, which are released from the magnetic piece at later time. The rolling beads with larger weight can be moved to desired position to counteract the imbalance force of the disk.

The various objects and advantages of the present invention will be more readily understood from the following detailed description when read in conjunction with the appended drawing, in which:

DETAIL DESCRIPTION OF PREFERRED EMBODIMENT

Figure 1:
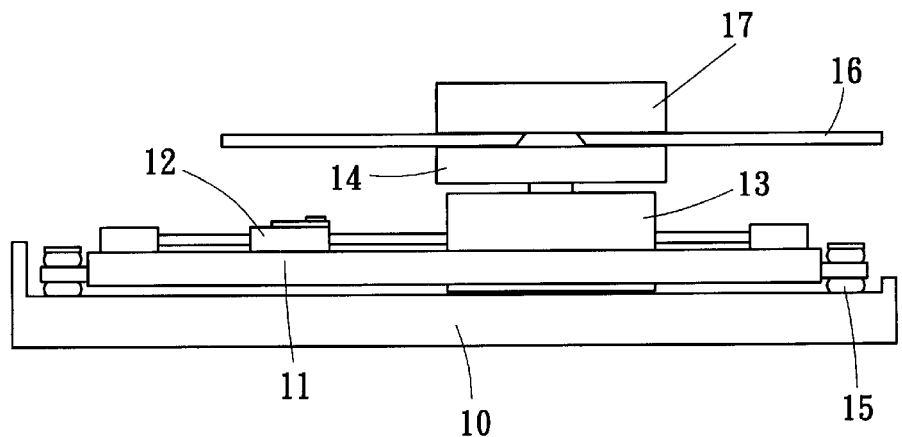
FIG. 1 is a side view of the prior art CD-ROM driver.
Figure 2:
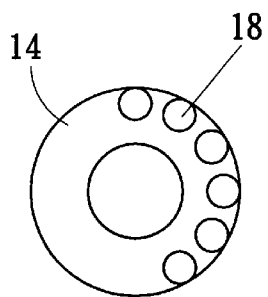
FIG. 2 is a planar view of the prior art non-magnetic type automatic balance devices for CD-ROM driver.
Figure 3:
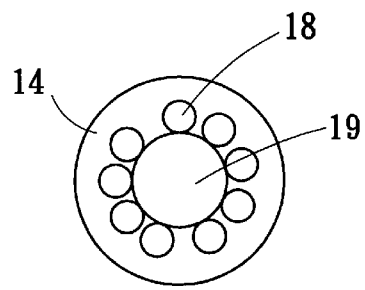
FIG. 3 is a planar view of the prior art magnetic type automatic balance devices for CD-ROM driver.
Figure 4:
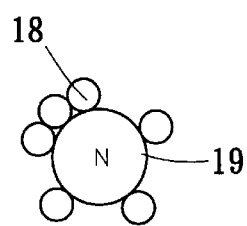
FIG. 4 is a planar view of the prior art magnetic type automatic balance devices in dual-pole configuration for CD-ROM driver.
Figure 4:
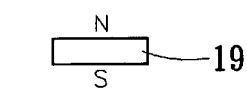
Figure 5:
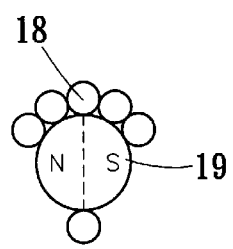
FIG. 5 is a planar view of the prior art magnetic type automatic balance devices in quadruple-pole configuration for CD-ROM driver.
Figure 5:
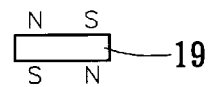
Figure 6:
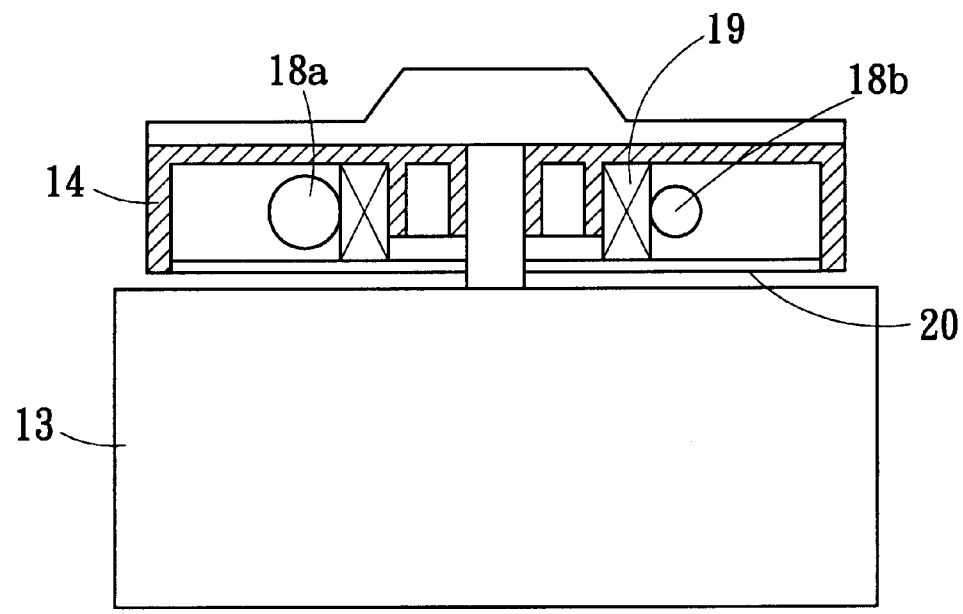
FIG. 6 is a side view of the first preferred embodiment of the present invention.

As shown in FIG. 6, the present invention is intended to provide an automatic magnetic-type balance device for disk, which comprises rolling beads of different sizes. The automatic magnetic-type balance device comprises a magnetic piece 19 within a turntable 14 of the CD-ROM driver, and a plurality of rolling beads 18a and 18b of different sizes. The plurality of rolling beads have more than two different sizes. In this embodiment, the plurality of rolling beads comprises large-size rolling beads 18a and small-size rolling beads 18*b* and arranged on the circumference of the magnetic piece 19. The turntable 14 has an opened bottom side sealed by a magnetic or non-magnetic cover 20. The turntable 14 is fixed on a spindle motor 13 of the CD-ROM driver and is driven by the spindle motor 13 of the CD-ROM driver.

Figure 7:
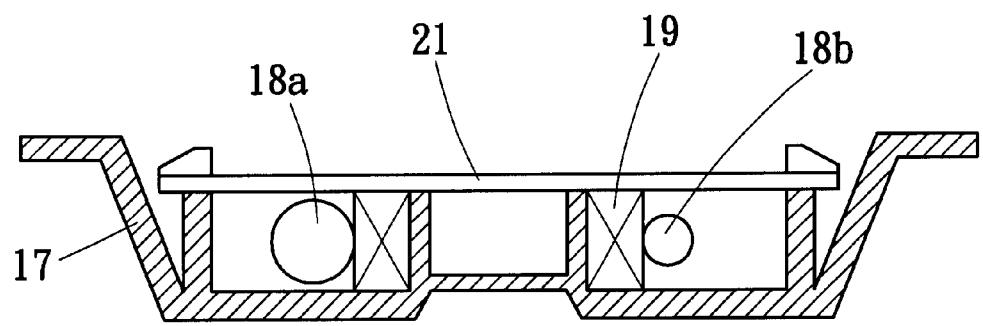
FIG. 7 is a side view of the second preferred embodiment of the present invention.

As shown in FIG. 7, the automatic magnetic-type balance device according to the present invention can also be provided within the clamping chassis 17 of the CD-ROM driver. The automatic magnetic-type balance device for disk comprises a magnetic piece 19 within the clamping chassis, 17 of the CD-ROM driver, and a plurality of rolling beads 18*a* and 18*b* of different sizes. The plurality of rolling beads 18*a* and 18*b* have more than two different sizes. In this embodiment, the plurality of rolling beads comprises large-size rolling beads 18*a* and small-size rolling beads 18*b* and arranged on the circumference of the magnetic piece 19. The clamping chassis 17 has an opened top side sealed by a magnetic or non-magnetic lid 21.

Figure 8:
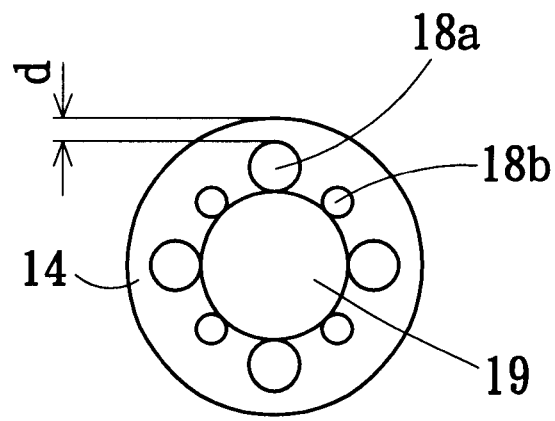
FIG. 8 is a planar view showing the rolling beads in even distribution.

As shown in FIG. 8, the large-size rolling beads 18*a* and small-size rolling beads 18*b* are evenly and alternatively arranged on magnetic piece 19 and within the turntable 14 or the clamping chassis 17 of the CD-ROM driver. When the large-size rolling beads 18*a* are attracted by the magnetic piece 19, the separation d between the large-size rolling beads 18*a* and the inner wall of the turntable 14 (or the clamping chassis 17) should be smaller than the diameter of the small-size rolling beads 18*b*.

Figure 9:
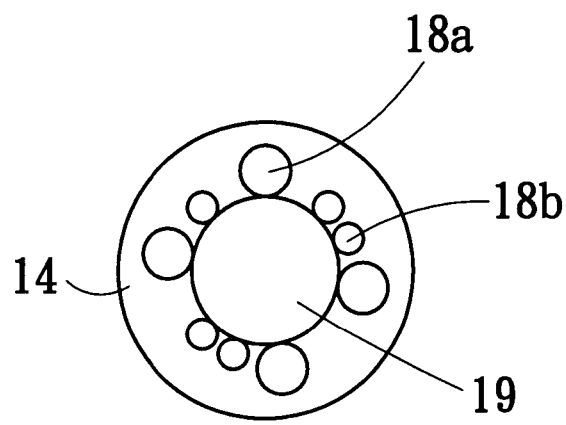
FIG. 9 is a planar view showing the rolling beads in random distribution.

Moreover, as shown in FIG. 9, the large-size rolling beads 18*a* and small-size rolling beads 18*b* can also be randomly arranged on magnetic piece 19 and within the turntable 14 or the clamping chassis 17 of the CD-ROM driver.

Figure 10:
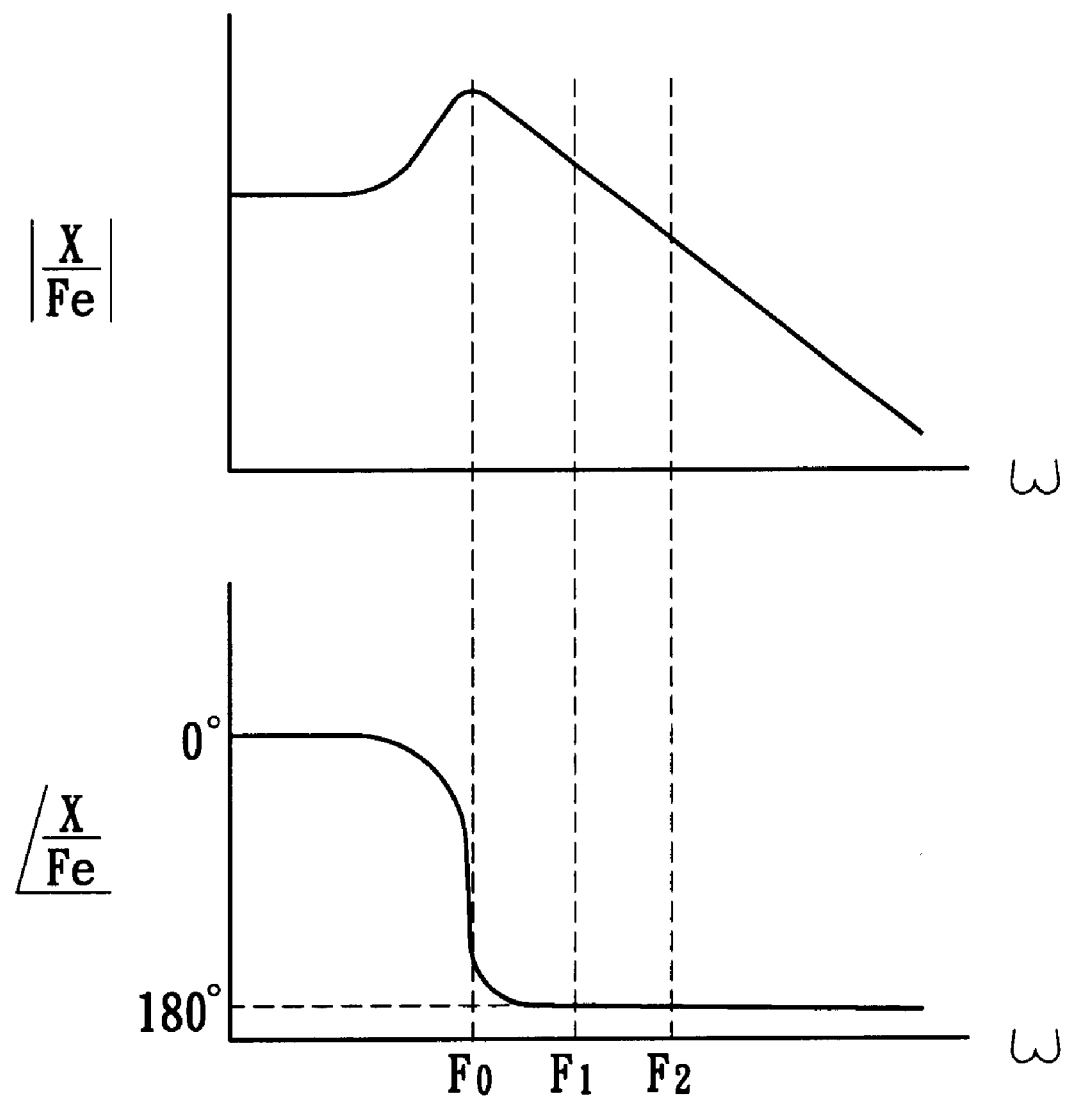
FIG. 10 shows the frequency response of the automatic magnetic-type balance device according to the present invention.

FIG. 10 shows the frequency response of the automatic magnetic-type balance device according to the present invention, and the symbols have following meanings:

X: the displacement of stage due to the rotation of imbalance disk;

Fe: force exerted on the stage due to the rotation of imbalance disk;

ω: angular frequency of the disk

F0: natural angular frequency of the composite structure of the stage and the flexible supports;

F1: angular frequency of the disk when the large-size rolling beads are released from the magnetic piece;

F2: angular frequency of the disk when the small-size rolling beads are released from the magnetic piece.

Figure 11:
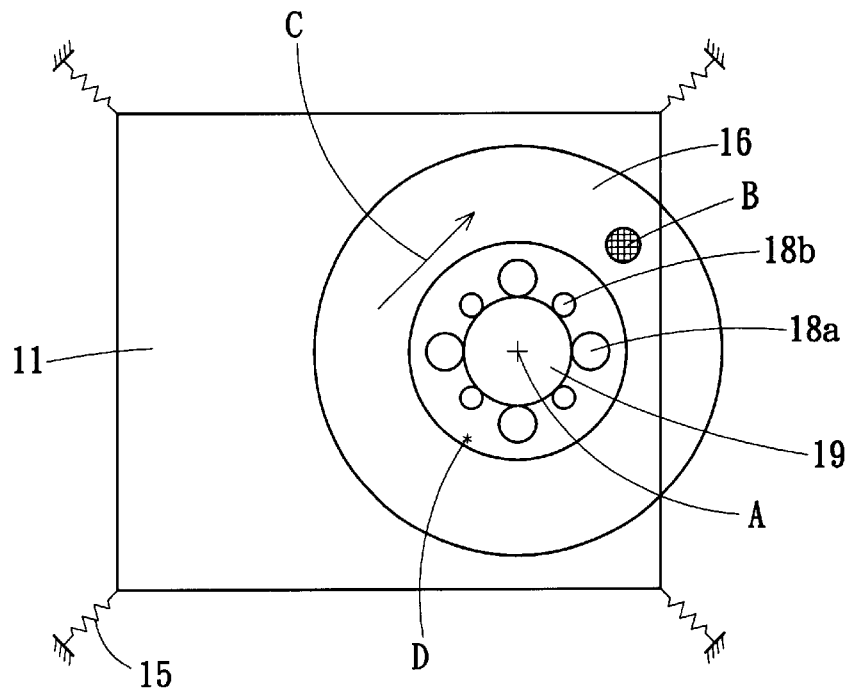
FIGS. 11 to 13 show operation of the present invention.

When the disk angular frequency is smaller than F0, the disk center A and the disk mass center B are located at same side with respect to the stage oscillation center D, as shown in FIGS. 10 and 11, the movement C of the stage and the disk mass center B are along the same direction. The magnetic piece 19 is such designed that the magnetic force thereof attracts both the large-size rolling beads 18*a* and the small-size rolling beads 18*b* when the angular frequency of the disk is smaller than F0. At this condition, the large-size rolling beads 18*a* and the small-size rolling beads 18*b* are attached on the surface of the magnetic piece 19 and rotated with the disk 16 against the centrifugal force. Therefore, the beads will not be moved to the inclined direction of the off-center disk. Therefore, the present invention has the advantages of the conventional magnetic type automatic balance devices for CD-ROM driver.

Figure 12:
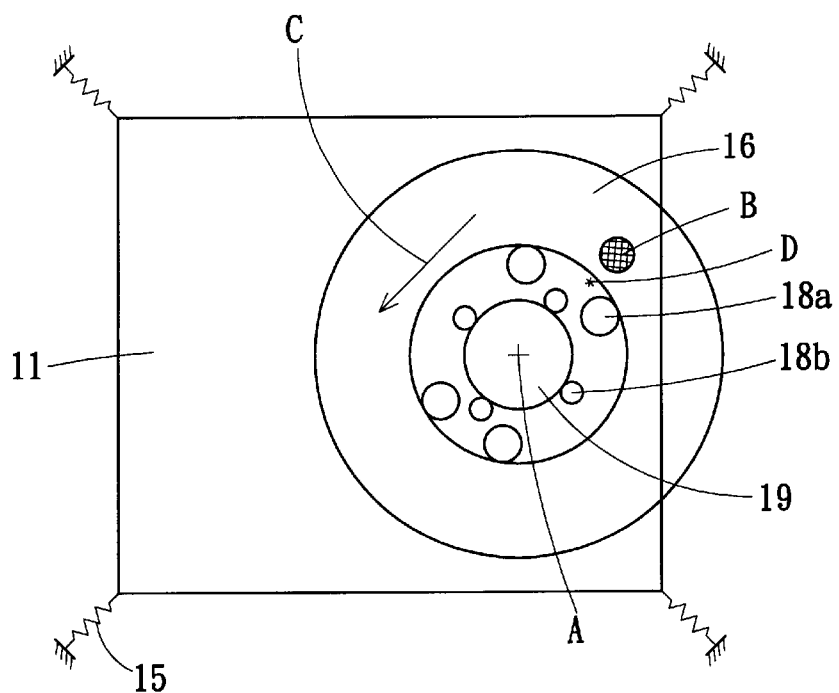

When the disk angular frequency is larger than F0 and equal to F1, as shown in FIGS. 10 and 12, the movement C of the stage and the disk mass center B are in the opposite direction, and the disk center A and the disk mass center B are located at opposite side with respect to the stage oscillation center D. The large-size rolling beads 18*a* will be released from the magnetic piece 19 due to the increased centrifugal force and moved to side opposite to the disk mass center B due to the vibration of stage rotation. In conventional magnetic type automatic balance devices for CD-ROM driver, the rolling beads of same size have large frictional force due to large centrifugal force. The rolling beads cannot move to desired positions to counteract the imbalance force. In the present invention, the small-size rolling beads 18*b* have smaller centrifugal force due to smaller weight thereof. Therefore, the small-size rolling beads 18*b* are attached on the magnetic piece 19 when the disk angular frequency is larger than F0 and equal to F1.

Figure 13:
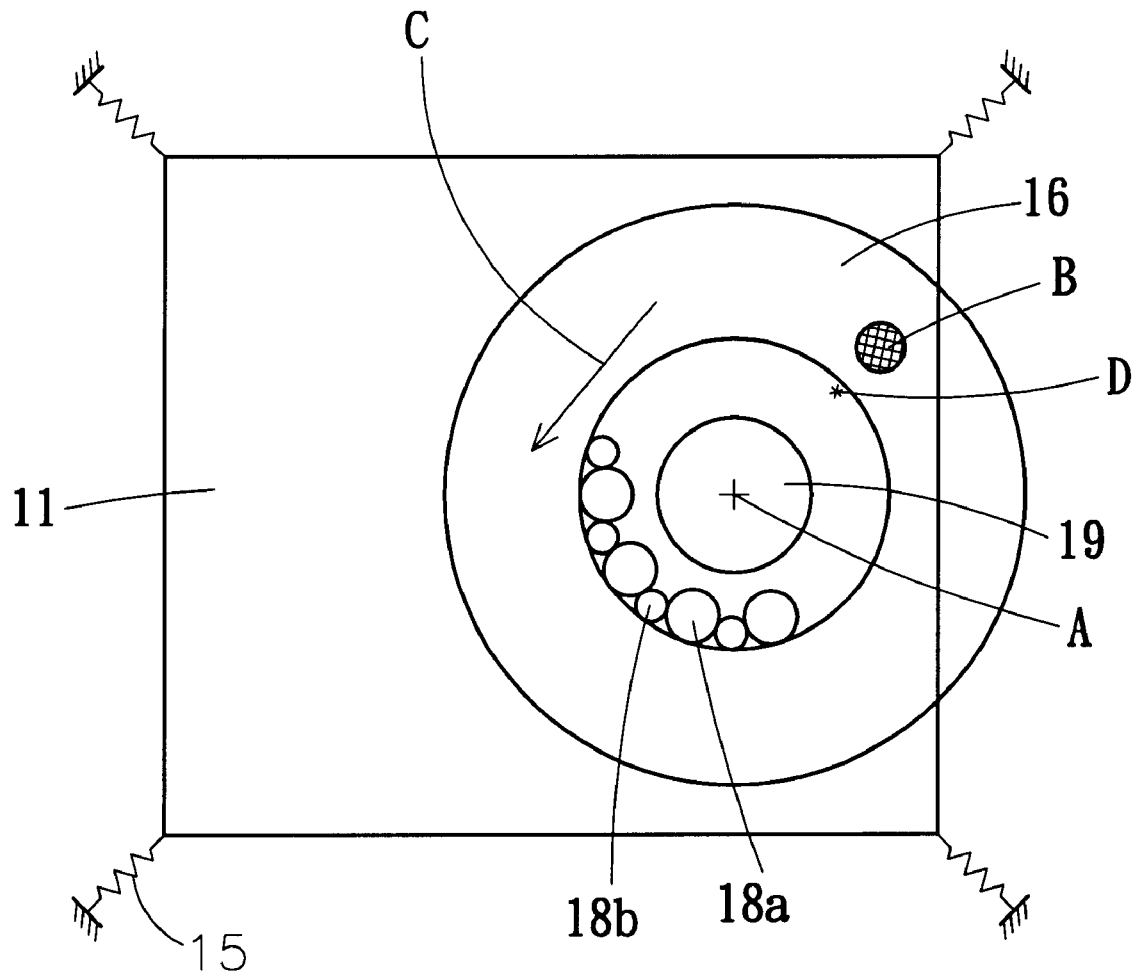

When the disk angular frequency is larger than F0 and F1 and equal to or exceeding F2, as shown in FIGS. 10 and 13, the movement C of the stage and the disk mass center B are along the opposite direction, and the disk center A and the disk mass center B are located at opposite side with respect to the stage oscillation center D. The large-size rolling beads 18*a* are previously released from the magnetic piece 19 and the small-size rolling beads 18*b* are originally attached on the magnetic piece 19. At this time, the small-size rolling beads 18*b* are subjected to larger centrifugal force and released from the magnetic piece 19. If the large-size rolling beads 18*a* are not previously located at desired position, i.e., the position opposite to the disk mass center B. The small-size rolling beads 18*b* released from the magnetic piece 19 will collide with the large-size rolling beads 18*a*, the large-size rolling beads 18*a* gains kinetic energy to move to the desired position opposite to the disk mass center B. Therefore, the automatic balance device for disk according to the present invention can provide improved balance effect.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

We claim:

1. An automatic balance device for a CD-ROM driver comprising:

a hollow annular turntable having inner and outer annular walls, said inner and outer annular walls defining an annular chamber;

an annular magnetic member being received within said annular chamber, an inner surface of said annular magnetic member abutting against said inner annular wall;

a first set of beads being received within said annular chamber and being magnetically attracted to said annular magnetic member, each of said beads having a first radius; and, a second set of beads being received within said annular chamber and being magnetically attracted to said annular magnetic member, each of said beads having a second radius, said second radius being greater than said first radius, a distance between said second set of beads and said outer annular wall being less than a first diameter of said first set of beads, said first set of beads being greater or equal in number to said second set of beads, whereby at least a portion of said first set of beads collides with a portion of said second set of beads for transferring kinetic energy therebetween thereby counterbalancing unwanted vibration in said hollow annular turntable.

2. The automatic balance device for a CD-ROM driver as recited in claim 1 wherein said hollow annular turntable includes a cover.

3. The automatic balance device for a CD-ROM driver as recited in claim 1, wherein each of said beads of said first set of beads are positionally located between a pair of beads of said second set of beads.

\* \* \* \* \*